United States Patent
Park et al.

(10) Patent No.: US 11,398,882 B2
(45) Date of Patent: Jul. 26, 2022

(54) EARLY TERMINATION OF REPEATED TRANSMISSIONS BETWEEN TERMINAL AND BASE STATION IN WIRELESS COMMUNICATION SYSTEM

(71) Applicant: LG ELECTRONICS INC., Seoul (KR)

(72) Inventors: Changhwan Park, Seoul (KR); Joonkui Ahn, Seoul (KR); Seonwook Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 16/609,690

(22) PCT Filed: May 4, 2018

(86) PCT No.: PCT/KR2018/005215
§ 371 (c)(1),
(2) Date: Oct. 30, 2019

(87) PCT Pub. No.: WO2018/203722
PCT Pub. Date: Nov. 8, 2018

(65) Prior Publication Data
US 2020/0092044 A1 Mar. 19, 2020

Related U.S. Application Data

(60) Provisional application No. 62/501,685, filed on May 4, 2017, provisional application No. 62/505,132, filed (Continued)

(30) Foreign Application Priority Data

Apr. 5, 2018 (KR) .................. 10-2018-0039952

(51) Int. Cl.
H04L 1/16 (2006.01)
H04L 1/18 (2006.01)
H04W 28/04 (2009.01)

(52) U.S. Cl.
CPC .......... *H04L 1/1671* (2013.01); *H04L 1/1816* (2013.01); *H04W 28/04* (2013.01)

(58) Field of Classification Search
CPC ..... H04L 1/1671; H04L 1/1816; H04W 28/04
See application file for complete search history.

(56) References Cited

U.S. PATENT DOCUMENTS 9,258,087 B2 2/2016 Somasundaram et al.
2012/0051305 A1 3/2012 Wang et al.
(Continued)

FOREIGN PATENT DOCUMENTS

CN 105991243 A 10/2016
EP 2498435 A2 9/2012
(Continued)

OTHER PUBLICATIONS

Ericsson, "NB-IoT—Support for operation with Multiple PRBs", 3GPP TSG-RAN1 NB-IOT Ad Hoc, Jan. 18-20, 2016, R1-160078, XP051053399.
(Continued)

*Primary Examiner* — Christopher M Crutchfield
*Assistant Examiner* — Tito Q Pham
(74) *Attorney, Agent, or Firm* — Dentons US LLP

(57) ABSTRACT

Various embodiments provide methods whereby a terminal and a base station transmit and receive signals in a wireless communication system, and devices for supporting same. Comprised are the steps of: transmitting a physical uplink shared channel (PUSCH) to a base station; receiving, from the base station, hybrid automatic repeat request-acknowledgment (HARQ-ACK) information on the PUSCH before
(Continued)

transmitting the PUSCH a number of times, the number of times being the number of repeated transmissions corresponding to the PUSCH; and determining whether or not to end the transmission of the PUSCH on the basis of the received HARQ-ACK information. Accordingly, the terminal can effectively control unnecessarily repeated transmission of uplink data, and the power consumption of the terminal can be reduced.

15 Claims, 11 Drawing Sheets

Related U.S. Application Data on May 12, 2017, provisional application No. 62/543,921, filed on Aug. 10, 2017, provisional application No. 62/547,771, filed on Aug. 19, 2017, provisional application No. 62/586,212, filed on Nov. 15, 2017, provisional application No. 62/653,544, filed on Apr. 5, 2018.

(56) References Cited

U.S. PATENT DOCUMENTS

| | | | |
|---|---|---|---|
| 2015/0003425 A1* | 1/2015 | Kim | H04L 5/0055 370/336 |
| 2015/0245323 A1* | 8/2015 | You | H04W 72/042 370/329 |
| 2016/0183231 A1* | 6/2016 | Shi | H04W 72/0446 370/329 |
| 2016/0212734 A1 | 7/2016 | He et al. | |
| 2016/0226649 A1* | 8/2016 | Papasakellariou | H04L 1/0001 |
| 2017/0034850 A1 | 2/2017 | Rico Alvarino et al. | |
| 2017/0134880 A1* | 5/2017 | Rico Alvarino | H04L 5/0007 |
| 2017/0141833 A1* | 5/2017 | Kim | H04L 5/0057 |
| 2017/0303248 A1* | 10/2017 | Chatterjee | H04L 1/1861 |
| 2018/0020378 A1* | 1/2018 | Tsuboi | H04W 74/08 |
| 2019/0182824 A1* | 6/2019 | Chatterjee | H04L 5/0053 |
| 2020/0014498 A1* | 1/2020 | Bergman | H04L 1/0025 |
| 2020/0100316 A1* | 3/2020 | Liu | H04W 72/042 |
| 2020/0287663 A1* | 9/2020 | Chen | H04L 1/189 |

FOREIGN PATENT DOCUMENTS

| | | |
|---|---|---|
| KR | 1020170044187 A | 4/2017 |
| WO | 2016072591 A1 | 5/2016 |
| WO | 2016073591 A1 | 5/2016 |
| WO | 2017023200 A1 | 2/2017 |

OTHER PUBLICATIONS

E.F. Charles LaBerge et al, "Expressions for the Mean Transfer Delay of Generalized M-Stage Hybrid ARQ Protocols", IEEE Transactions on Communications, vol. 52, No. 6, Jun. 2004.

X. Li et al., "LTE—A system downlink HARQ system-level design and simulation", Applied Mechanics and Materials vols. 513-517 (2014), pp. 2518-2521.

* cited by examiner

EARLY TERMINATION OF REPEATED TRANSMISSIONS BETWEEN TERMINAL AND BASE STATION IN WIRELESS COMMUNICATION SYSTEM

TECHNICAL FIELD

The present disclosure relates to a wireless communication system, and more particularly, to a method and apparatus for transmitting and receiving a signal between a user equipment (UE) and a base station (BS) in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The present disclosure is intended to reduce unnecessary repeated transmissions of uplink data by performing a hybrid automatic repeat request-acknowledgement (HARQ-ACK) feedback operation for a physical uplink shared channel (PUSCH) before the PUSCH is transmitted as many times as a repetition number configured for the PUSCH.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal between a user equipment (UE) and a base station (BS) in a wireless communication system.

In an aspect of the present disclosure, a method of transmitting and receiving a signal to and from a BS by a UE in a wireless communication system includes transmitting a physical uplink shared channel (PUSCH) to the BS, receiving hybrid automatic repeat request-acknowledgment (HARQ-ACK) information for the PUSCH from the BS before transmitting the PUSCH as many times as a repetition number corresponding to the PUSCH, and determining whether to terminate the transmission of the PUSCH based on the received HARQ-ACK information.

According to an embodiment of the present disclosure, the HARQ-ACK information may be transmitted in downlink control information (DCI) or an uplink grant used to indicate uplink scheduling information, and the DCI or the uplink grant may be transmitted on a machine type communication physical downlink control channel (MPDCCH) or a narrowband physical downlink control channel (NPDCCH).

According to an embodiment of the present disclosure, when the HARQ-ACK information is transmitted in the DCI, one or more states of the DCI may be used to indicate HARQ-ACK feedback for the PUSCH.

According to an embodiment of the present disclosure, when the HARQ-ACK information is transmitted in the DCI, the DCI may be of the same size as DCI format 6-0A or DCI format 6-0B.

According to an embodiment of the present disclosure, when the HARQ-ACK information is transmitted in the DCI, the HARQ-ACK information may be transmitted in DCI of a different format according to a coverage enhancement (CE) mode of the UE. When the UE operates in CE mode A, one or more states of a resource assignment field in DCI format 6-0A may be used to indicate HARQ-ACK feedback for the PUSCH, and wherein when the UE operates in CE mode B, one or more states of a modulation and coding scheme (MCS) field in DCI format 6-0B may be used to indicate HARQ-ACK feedback for the PUSCH.

According to an embodiment of the present disclosure, the UE may operate in full duplex-frequency division duplex (FD-FDD) or time division duplex (TDD).

According to an embodiment of the present disclosure, the method may further include obtaining information about at least one of a duration of the HARQ-ACK feedback, a periodicity of the HARQ-ACK feedback, or a condition for performing the HARQ-ACK feedback from an uplink grant or a higher-layer message, and performing the HARQ-ACK feedback based on the obtained information.

According to an embodiment of the present disclosure, the condition for performing the HARQ-ACK feedback may include at least one condition of a CE mode, an uplink repetition number, uplink transmission power, or an initial transmission or a retransmission.

According to an embodiment of the present disclosure, the reception of HARQ-ACK information may include receiving HARQ-ACK information for a plurality of HARQ processes, and the reception of HARQ-ACK information for a plurality of HARQ processes may include, when the number of bits used to transmit the HARQ-ACK information is less than the number of HARQ processes, bundling a predetermined number of HARQ processes among the plurality of HARQ processes into one group and receiving HARQ-ACK information for the group.

According to an embodiment of the present disclosure, the UE may be a UE operating in a machine type communication (MTC) or narrowband Internet of things (NB-IoT) system.

According to an embodiment of the present disclosure, when the UE is a UE operating in the NB-IoT system, one or more states of an MCS field and a subcarrier indication field in DCI may be used to indicate HARQ-ACK feedback for the PUSCH.

According to an embodiment of the present disclosure, the reception of HARQ-ACK information may include, when the repetition number is equal to or larger than a predetermined value, configuring a search space for monitoring HARQ-ACK information, and receiving the HARQ-ACK information, after the PUSCH is transmitted as many times as or more times than a predetermined ratio of the repetition number.

In another aspect of the present disclosure, a method of transmitting and receiving a signal to and from a UE by a BS in a wireless communication system includes receiving a PUSCH from the UE, determining HARQ-ACK information for the PUSCH, and transmitting the determined HARQ-ACK information to the UE before receiving the PUSCH as many times as a repetition number corresponding to the PUSCH.

In another aspect of the present disclosure, a UE for transmitting and receiving a signal to and from a BS in a wireless communication system includes a transceiver and a processor. The processor is configured to control the transceiver to transmit a PUSCH to the BS, control the transceiver to receive HARQ-ACK information for the PUSCH from the BS before transmitting the PUSCH as many times as a repetition number corresponding to the PUSCH, and determine whether to terminate the transmission of the PUSCH based on the received HARQ-ACK information.

In another aspect of the present disclosure, a BS for transmitting and receiving a signal to and from a UE in a wireless communication system includes a transceiver and a processor. The processor is configured to control the transceiver to receive a PUSCH from the UE, determine HARQ-ACK information for the PUSCH, and control the transceiver to transmit the determined HARQ-ACK information to the UE before receiving the PUSCH as many times as a repetition number corresponding to the PUSCH.

It is to be understood that both the foregoing general description and the following detailed description of the present disclosure are exemplary and explanatory and are intended to provide further explanation of the disclosure as claimed.

Advantageous Effects

According to various embodiments of the present disclosure, a user equipment (UE) may effectively control unnecessary repeated transmissions of uplink data.

Further, according to various embodiments of the present disclosure, the power consumption of a UE may be reduced because unnecessary repeated transmissions of uplink data are prevented.

Further, according to various embodiments of the present disclosure, a base station (BS) may efficiently use radio resources because unnecessary repeated transmissions of uplink data are reduced.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

MODE FOR CARRYING OUT THE PRESENT DISCLOSURE

Figure 1:
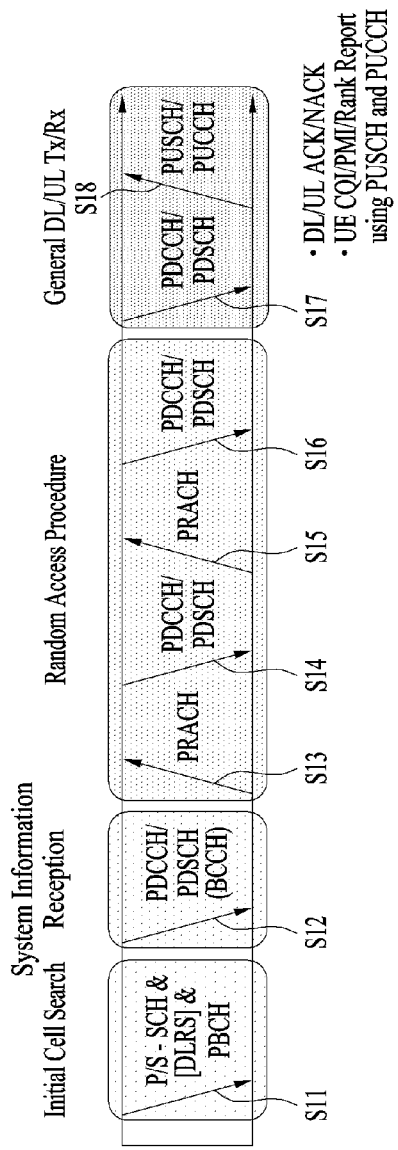
FIG. 1 is a diagram illustrating physical channels and a signal transmission procedure using the physical channels according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an institute of electrical and electronics engineers (IEEE) 802.xx system, a $3^{rd}$ generation partnership project (3GPP) system, a 3GPP long term evolution (LTE) system, a 3GPP $5^{th}$ generation (5G) new RAT (NR) system, and a 3GPP2 system. In particular, the embodiments of the present disclosure may be supported by the standard specifications, 3GPPTS 36.211, 3GPPTS 36.212, 3GPPTS 36.213, 3GPPTS 36.321, 3GPPTS 36.331, 3GPPTS 38.211, 3GPPTS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP long term evolution (LTE)/long term evolution-advanced (LTE-A) systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of universal mobile telecommunications system (UMTS). 3GPP LTE is a part of evolved UMTS (E-UMTS) using E-UTRA, adopting 01-DMA for DL and SC-FDMA for UL. LTE-A is an evolution of 3GPP LTE. While embodiments of the present disclosure are described in the context of a 3GPP NR system as well as a 3GPP LTE/LTE-A system in order to clarify the technical features of the present disclosure, the present disclosure is also applicable to an IEEE 802.16e/m system, and so on.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 is a diagram illustrating physical channels and a signal transmission procedure using the physical channels according to an embodiment of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell identifier (ID) by receiving a primary synchronization channel (P-SCH) and a secondary synchronization channel (S-SCH) from the eNB.

Then the UE may acquire information broadcast in the cell by receiving a physical broadcast channel (PBCH) from the eNB.

During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S12).

After acquiring the more detailed system information, the UE may perform a random access procedure in steps S13 to S16 to completely establish the connection with the eNB. For example, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a physical uplink shared channel (PUSCH) and/or a physical uplink control channel (PUCCH) to the eNB (S18), in a general UL/DL signal transmission procedure.

Control information that the UE transmits to the eNB is generically called uplink control information (UCI). The UCI includes a hybrid automatic repeat and request acknowledgement/negative acknowledgement (HARQ- ACK/NACK), a scheduling request (SR), a channel quality indicator (CQI), a precoding matrix index (PMI), a rank indicator (RI), etc. An HARQ ACK/NACK may also be referred to as an HARQ-ACK, an ACK/NACK (A/N), or an HARQ-ACK feedback, which should not be construed as limiting the present disclosure. An HARQ-ACK includes at least one of positive ACK (referred to simply as ACK), negative ACK (NACK), discontinuous transmission (DTX), or NACK/DTX. Although UCI is generally transmitted on a PUCCH, when control information and traffic data should be transmitted simultaneously, the UCI may be transmitted on a PUSCH. Further, the UCI may be transmitted aperiodically on the PUSCH in response to a request/command from a network.

In the LTE system, UCI is generally transmitted on a PUCCH periodically. However, if control information and traffic data should be transmitted simultaneously, the UCI may be transmitted on a PUSCH. In addition, the UE may transmit the UCI aperiodically on the PUSCH, upon receipt of a request/command from the network.

1.2. Resource Structure

Figure 2:
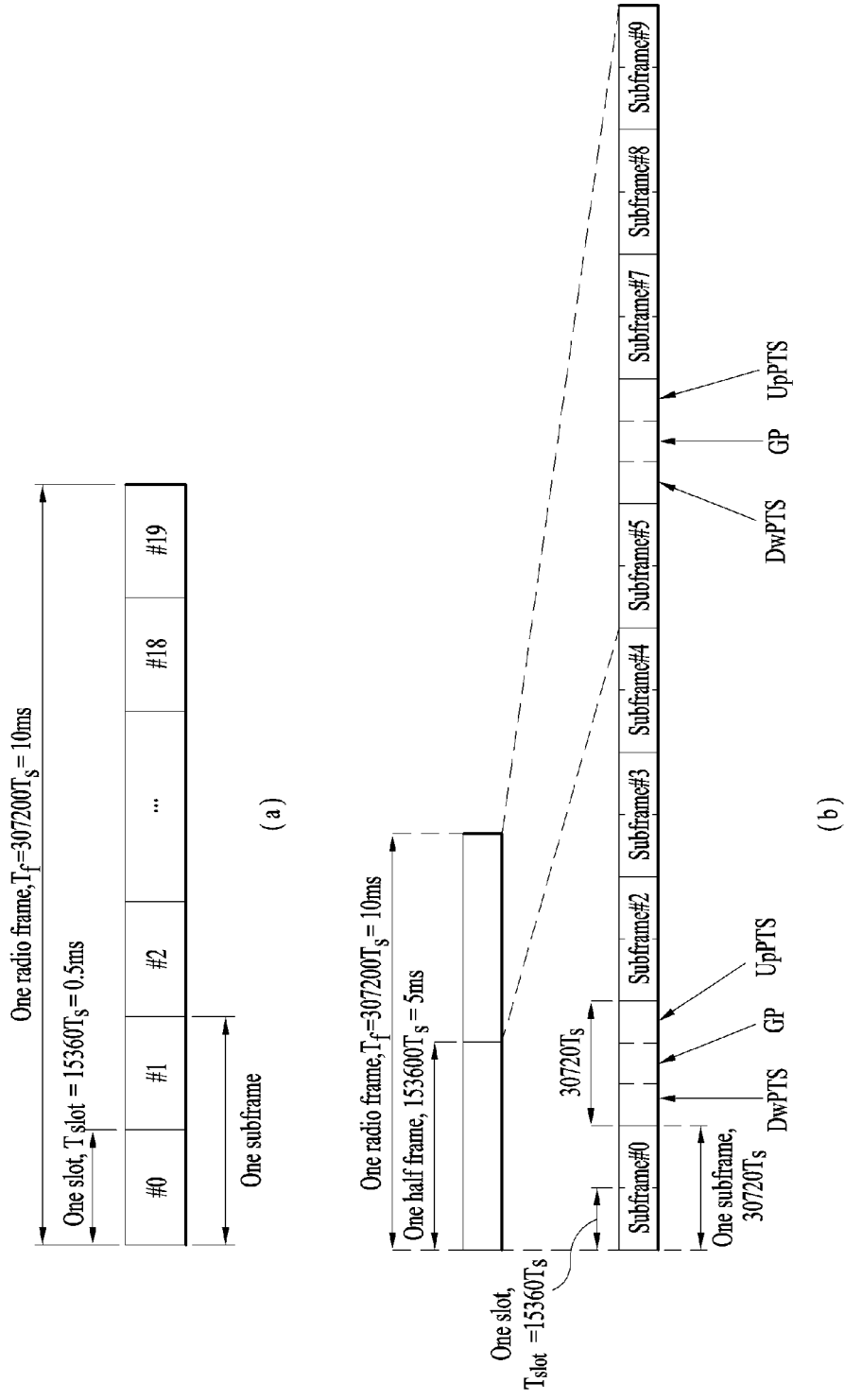
FIG. 2 is a diagram illustrating radio frame structures according to an embodiment of the present disclosure.

FIG. 2 illustrates radio frame structures according to an embodiment of the present disclosure.

FIG. 2(a) illustrates frame structure type 1. Frame structure type 1 is applicable to both a full frequency division duplex (FDD) system and a half FDD system.

One radio frame is 10 ms (Tf=307200·Ts) long, including equal-sized 20 slots indexed from 0 to 19. Each slot is 0.5 ms ($T_{slot}$=15360·Ts) long. One subframe includes two successive slots. An $i^{th}$ subframe includes $2i^{th}$ and $(2i+1)^{th}$ slots. That is, a radio frame includes 10 subframes. A time required for transmitting one subframe is defined as a transmission time interval (TTI). $T_s$ is a sampling time given as $T_s$=1/(15 kHz×2048)=3.2552×10-8 (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An $i^{th}$ subframe includes $2i^{th}$ and $(2i+1)^{th}$ slots each having a length of 0.5 ms (Tslot=15360·Ts). $T_s$ is a sampling time given as $T_s$=1/(15 kHz×2048)=3.2552×10-8 (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

In TDD, the same frequency band is divided into DL subframes and UL subframes in the time domain. According to a TDD configuration, the ratio between DL subframes and UL subframes may be set to M:1 where M is the number of DL subframes corresponding to one UL subframe. Therefore, the UE transmits ACKs/NACKs for a plurality of PDSCHs transmitted in M DL subframes in one UL subframe.

However, the radio frame structure is merely exemplary, and the number of subframes in a radio frame, the number of slots in a subframe, or the number of symbols in a slot may vary according to embodiments of the present disclosure.

[Table 1] below lists special subframe configurations (DwPTS/GP/UpPTS lengths).

TABLE 1

| | | Normal cyclic prefix in downlink | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added.

The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

referred to as DL scheduling information or a DL grant, and the transmission format and resource allocation information of an uplink shared channel (UL-SCH) may be referred to as UL scheduling information or a UL grant.

DCI transmitted on one PDCCH may have a different size and usage according to a DCI format, and a different size according to a coding rate.

The PDCCH is transmitted in an aggregate of one or more contiguous control channel elements (CCEs). A CCE is a

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
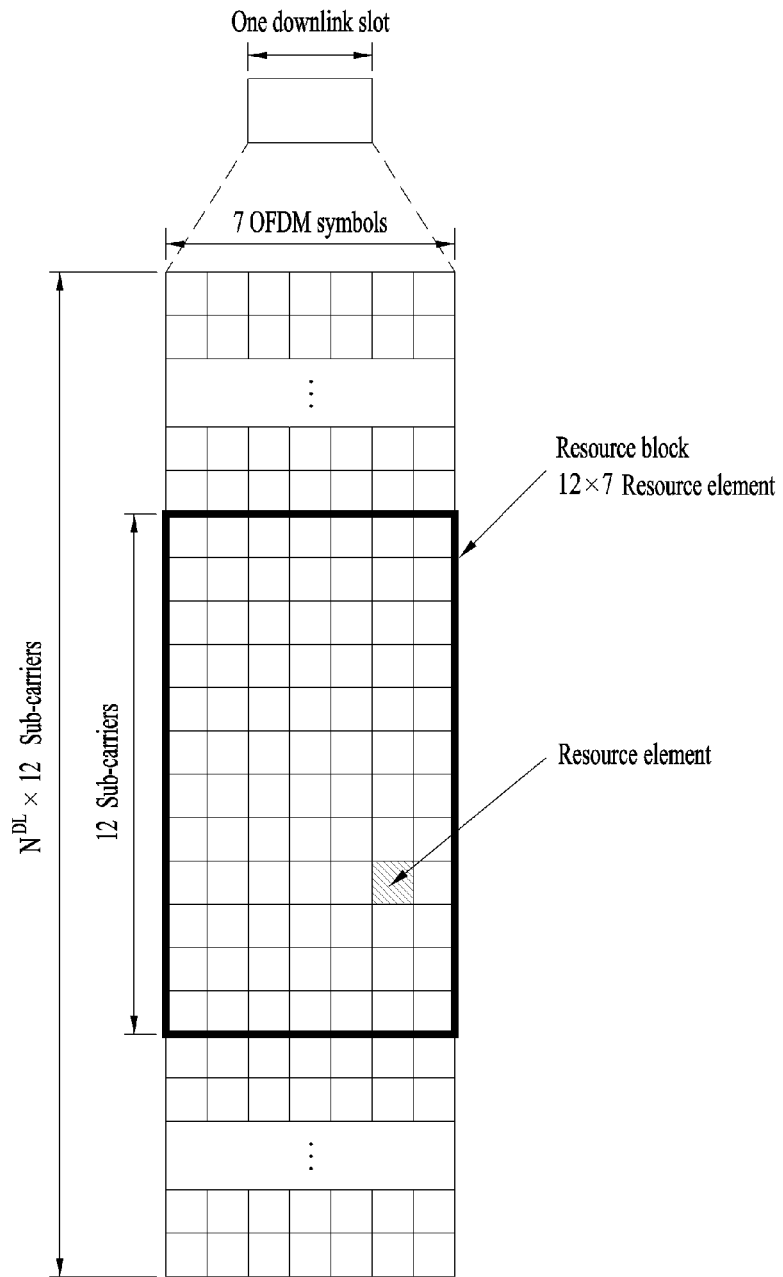
FIG. 3 is a diagram illustrating a resource grid for the duration of a downlink slot according to an embodiment of the present disclosure.

FIG. 3 is a diagram illustrating a resource grid for the duration of a DL slot according to an embodiment of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
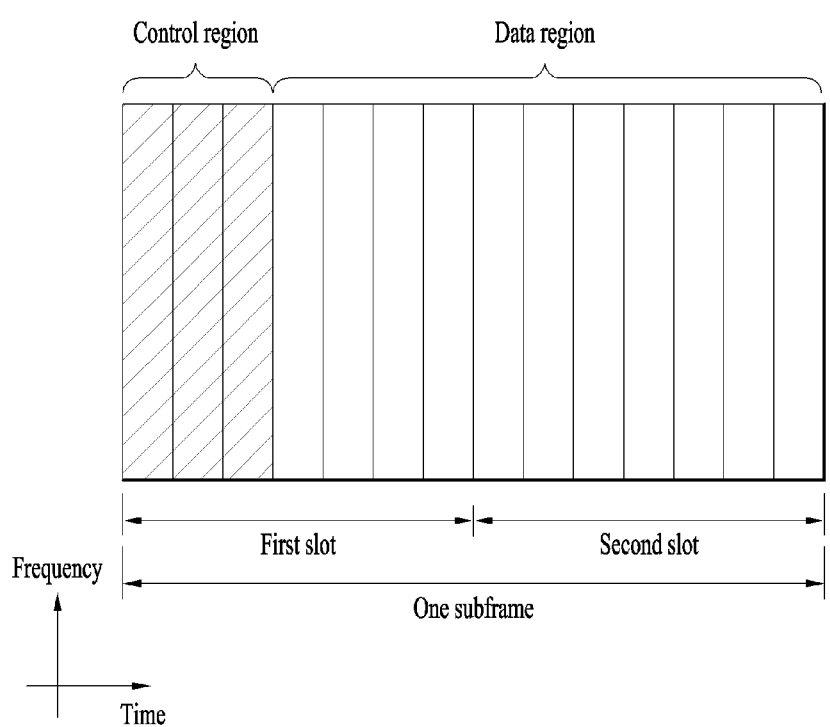
FIG. 4 is a diagram illustrating the structure of a downlink subframe according to an embodiment of the present disclosure.

FIG. 4 is a diagram illustrating the structure of a UL subframe according to an embodiment of the present disclosure.

Referring to FIG. 4, a DL subframe may be divided into a control region and a data region in the time domain. Up to 3 (or 4) OFDM symbols at the start of the first slot of the DL subframe are the control region, and the remaining OFDM symbols are the data region in which a PDSCH is allocated. DL control channels used in the LTE system may include, but not limited to, for example, a physical control format indicator channel (PCFICH), a physical downlink control channel (PDCCH), and a physical hybrid-ARQ indicator channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called downlink control information (DCI). For example, the DCI may include, but not limited to, for example, DL resource allocation information, UL resource allocation information, or a UL transmission (Tx) power control command for any UE group.

The transmission format and resource allocation information of a downlink shared channel (DL-SCH) may be logical allocation unit used to provide the PDCCH with a coding rate based on a radio channel state. A CCE corresponds to a plurality of resource element groups (REGs). The format of the PDCCH and the number of PDCCH bits are determined according to the number of CCEs.

Further, a set of CCEs available for a PDCCH may be defined for each UE. A set of CCEs in which a UE may detect its PDCCH may be referred to as a PDCCH search space (SS) or an SS. Individual resources available for PDCCH transmission in the SS may be referred to as PDCCH candidates, and a set of PDCCH candidates to be monitored by the UE may be defined as an SS. The size of an SS may vary according to embodiments. SSs may be divided into a dedicated SS and a common SS. The dedicated SS may be referred to as a UE-specific search space (USS) and configured individually for each UE. Further, the common SS may be configured for a plurality of UEs.

The eNB may actually transmit a PDCCH in any PDCCH candidate within an SS, and the UE may monitor the SS to detect the PDCCH. The monitoring may mean attempting to decode each PDCCH within the SS according to a monitored DCI format.

The eNB may determine a DCI format in accordance with DCI to be transmitted to the UE and attach a cyclic redundancy check (CRC) to control information. The CRC is masked with an identifier (e.g., radio network temporary identifier (RNTI)) according to the owner or purpose of the PDCCH. For example, if the PDCCH is directed to a specific UE, the CRC may be masked with an ID (e.g., cell-RNTI (C-RNTI)) of the UE. If the PDCCH is for a paging message, the CRC may be masked with a paging ID (e.g., paging-RNTI (P-RNTI)). If the PDCCH is for system information (specifically, a system information block (SIC)), the CRC may be masked with a system information-RNTI (SI-RNTI). If the PDCCH is for a random access response, the CRC may be masked with a random access-RNTI (RA-RNTI).

A plurality of PDCCHs may be transmitted in the control region, and the UE may monitor the plurality of PDCCHs.

The UE may detect its PDCCH by monitoring the plurality of PDCCHs. Because the UE basically has no knowledge of a position at which its PDCCH is transmitted, the UE attempts to decode all PDCCHs of a corresponding DCI format in each subframe until detecting a PDCCH with its ID. The decoding may be referred to as blind decoding or blind detection.

Figure 5:
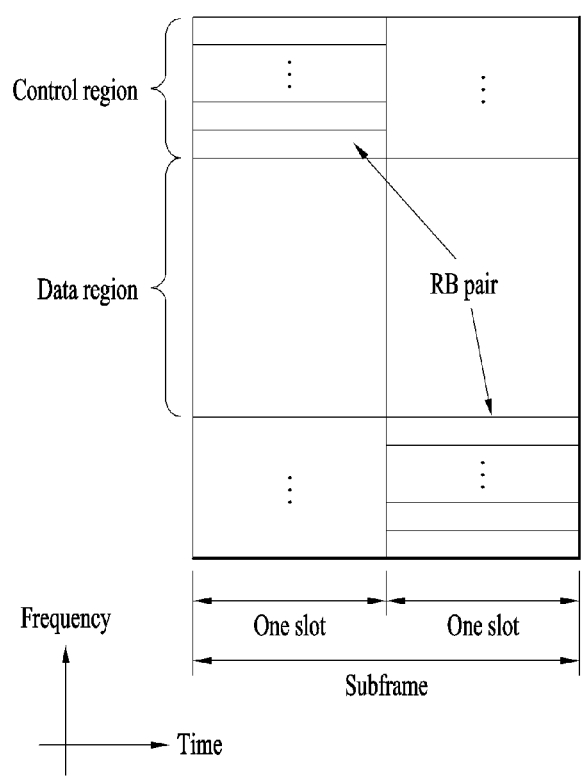
FIG. 5 is a diagram illustrating the structure of an uplink subframe according to an embodiment of the present disclosure.

FIG. 5 is a diagram illustrating the structure of a DL subframe according to an embodiment of the present disclosure.

Referring to FIG. 5, a UL subframe includes a plurality of (e.g., two) slots. A slot may include a different number of SC-FDMA symbols according to a cyclic prefix (CP) length. A UL subframe may be divided into a control region and a data region in the frequency domain. A PUCCH carrying UCI is allocated in the control region and a PUSCH carrying user data is allocated in the data region. To maintain a single carrier property, a single UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair allocated to the PUCCH frequency-hops over a slot boundary.

The PUCCH may be used to transmit control information such as an SR, an HARQ-ACK, and channel state information (CSI).

The SR may be information used to request UL-SCH resources, and may be transmitted by on-off keying (OOK).

The HARQ-ACK may be a response to a PDCCH and/or a response to a DL data packet (e.g., codeword) transmitted on a PDSCH. The HARQ-ACK may indicate whether the UE has succeeded in receiving the PDCCH or PDSCH. For example, a 1-bit HARQ-ACK may be transmitted in response to one DL codeword, and a 2-bit HARQ-ACK may be transmitted in response to two DL codewords. An HARQ-ACK may include ACK, NACK, DTX, or NACK/DTX, and the term HARQ-ACK may be interchangeably used with HARQ ACK/NACK, ACK/NACK, or HARQ-ACK feedback.

CSI may refer to feedback information for a DL channel. The CSI may include at least one of a CQI, a PMI, a precoding type indicator (PTI), or an RI.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

2.2. Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing (SCS) μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{subframe,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension.

Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

3. NB-IoT (NarrowBand-Internet of Things)

Now, a detailed description will be given of the technical features of an NB-IoT system. While NB-IoT conforming to the 3GPP LTE standard is focused on, for the convenience's sake, the configuration of the present disclosure may be applied in the same manner to the 3GPP NR standard. For this purpose, certain technical features may be interpreted with some replacement (e.g., a subframe is replaced with a slot).

Therefore, while NB-IoT is described below based on the LTE standard technology, NB-IoT may be interpreted in the context of the NR standard technology instead of the LTE standard technology within a range that could easily be derived by those skilled in the art.

3.1. Operation Modes and Frequencies

NB-IoT supports three operation modes: in-band mode, guard-band mode, and stand-alone mode. The same requirements apply to each mode.

(1) In the in-band mode, a part of the in-band resources of the LTE system are allocated to the NB-IoT system.

(2) In the guard-band mode, a guard frequency band of the LTE system is used, and an NB-IoT carrier is arranged as close as possible to an edge subcarrier of the LTE system.

(3) In the stand-alone mode, some carriers in the GSM band are allocated to the NB-IoT system.

An NB-IoT UE searches for an anchor carrier in units of 100 kHz, for initial synchronization, and the center frequency of the anchor carrier should be located within ±7.5 kHz from a 100-kHz channel raster in the in-band and guard-bands. The NB-IoT UE may refer to a UE operating in the NB-IoT system or a UE supporting NB-IoT. Further, the center 6 physical resource blocks (PRBs) of the LTE PRBs are not allocated to the NB-IoT system. Therefore, the anchor carrier may be located only in a specific PRB.

Figure 6:
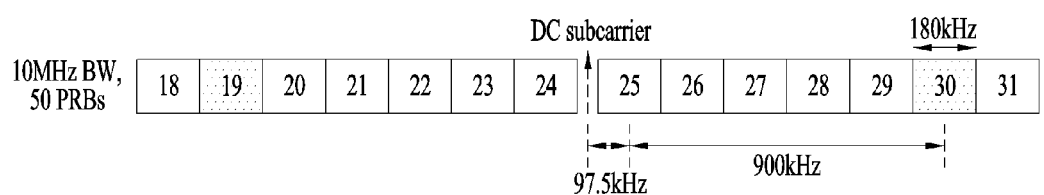
FIG. 6 is a diagram illustrating arrangement of an in-band anchor carrier in a long term evolution (LTE) system according to an embodiment of the present disclosure.

FIG. 6 is a diagram illustrating arrangement of an in-band anchor carrier in an LTE system according to an embodiment of the present disclosure.

As illustrated in FIG. 6, a direct current (DC) subcarrier is located on a channel raster. Since the center frequency spacing between adjacent PRBs is 180 kHz, the center frequencies of PRBs 4, 9, 14, 19, 30, 35, 40 and 45 are located at ±2.5 kHz from the channel raster.

When the bandwidth is 20 MHz, the center frequency of a PRB suitable for transmission on the anchor carrier is located at ±2.5 kHz from the channel raster, and when the bandwidth is 3 MHz, 5 MHz, or 15 MHz, the center frequency of a PRB suitable for transmission on the anchor carrier is located at ±7.5 kHz from the channel raster.

In the guard-band mode, given bandwidths of 10 MHz and 20 MHz, the center frequency of a PRB immediately adjacent to an edge PRB of the LTE system is located at ±2.5 kHz from the channel raster. Further, given bandwidths of 3 MHz, 5 MHz, and 15 MHz, a guard frequency band corresponding to three subcarriers from an edge PRB is used, and thus the center frequency of the anchor carrier may be located at ±7.5 kHz from the channel raster.

In the stand-alone mode, an anchor carrier is aligned with the 100-kHz channel raster, and all GSM carriers including the DC carrier may be available as NB-IoT anchor carriers.

Further, NB-IoT may support use of a plurality of carriers, and a combination of in-band and in-band, a combination of in-band and guard-band, a combination of guard-band and guard-band, and a combination of stand-alone and stand-alone are available.

3.2. Physical Channels 3.2.1. Downlink (DL)

In the NB-IoT system, OFDMA with a 15-kHz SCS is used for DL. OFDMA provides orthogonality between subcarriers, so that the NB-IoT system and the LTE system may coexist smoothly.

For DL, physical channels such as a narrowband physical broadcast channel (NPBCH), a narrowband physical downlink shared channel (NPDSCH), and a narrowband physical downlink control channel (NPDCCH) may be provided, and physical signals such as a narrowband primary synchronization signal (NPSS), a narrowband primary synchronization signal (NSSS), and a narrowband reference signal (NRS) are provided.

Figure 7:
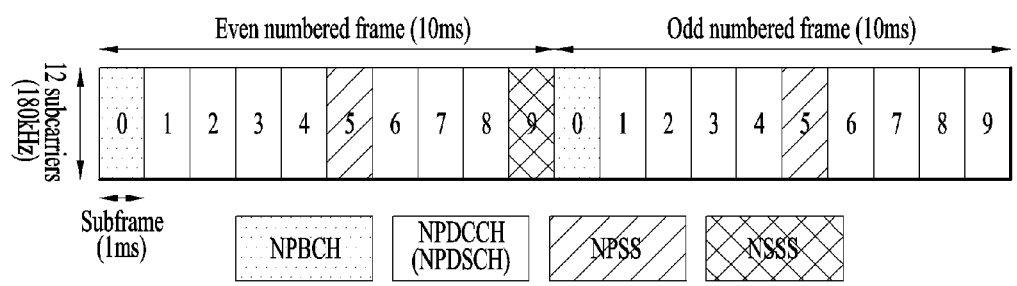
FIG. 7 is a diagram illustrating the transmission positions of downlink physical channels and downlink signals in an LTE system operating in frequency division duplex (FDD) according to an embodiment of the present disclosure.

FIG. 7 is a diagram illustrating the transmission positions of DL physical channels and DL signals in an LTE system operating in FDD according to an embodiment of the present disclosure.

An NB-IoT UE should acquire system information of a cell in order to access a network. To this end, the NB-IoT UE should acquire synchronization with the cell in a cell search procedure. To enable the NB-IoT UE to acquire the synchronization with the cell, synchronization signals may be transmitted on DL.

The NB-IoT UE acquires frequency synchronization, symbol synchronization, and frame synchronization using the synchronization signals and searches 504 physical cell IDs (PCIDs). Since the LTE synchronization signals are transmitted in 6-PRB resources, it is impossible to reuse the LTE synchronization signals in the NB-IoT system which uses 1 PRB.

In this context, new NB-IoT synchronization signals have been designed, and are applicable to the three operation modes of NB-IoT in the same manner.

As illustrated in FIG. 7, the NPBCH is transmitted in the first subframe of each radio frame, the NPSS is transmitted in the sixth subframe of each radio frame, and the NSSS is transmitted in the last subframe of each even-numbered frame.

More specifically, the NPSS is composed of a Zadoff-Chu (ZC) sequence with a sequence length of 11 and a root index of 5. The NPSS may be generated by the following Equation 1.

$$d_l(n) = S(l) \cdot e^{-j\frac{\pi u n(n+1)}{11}}, n = 0, 1, \ldots, 10 \qquad \text{[Equation 1]}$$

S(l) for symbol index l may be defined as illustrated in Table 6.

TABLE 6

| Cyclic prefix length | S(3), . . . , S(13) |
|---|---|
| Normal | 1  1  1  1  −1  −1  1  1  1  −1  1 |

The NSSS is composed of a combination of a ZC sequence of length 131 and a binary scrambling sequence such as a Hadamard sequence. In particular, the NSSS indicates a PCID to NB-IoT UEs within the cell by the combination of sequences.

The NSSS may be generated by Equation 2.

$$d(n) = b_q(m)e^{-j2\pi\theta_f n}e^{-j\frac{\pi u n'(n'+1)}{131}} \qquad \text{[Equation 2]}$$

Variables applied to Equation 2 may be defined as follows.

TABLE 7

| variable | definition |
|---|---|
| n | 0, 1, . . . , 131 |
| n' | n mod 131 |
| M | n mod 128 |

TABLE 7-continued

| variable | definition |
| --- | --- |
| u | $N_{ID}^{NCell}$ mod 126 + 3 |
| q | $\dfrac{N_{ID}^{NCell}}{126}$ |

A binary sequence bq(m) may be defined as illustrated in Table 8, and a cyclic shift $\theta_f$ for a frame number of may be defined by Equation 3 below.

TABLE 8

| q | $b_q(0), \ldots, b_q(127)$ |
| --- | --- |
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 1 −1 1 −1 −1 1 1 1 −1 1 −1 1 1 1 −1 1 −1 1 1 1 −1 1 −1 1 1 1 1 −1 1 −1 1 1 1 −1 1 −1 1 1 1 −1 1 −1 1 1 1 −1 1 −1 1 1 1 1 −1 1 −1 1 1 1 −1 1 −1 1 1 1 −1 1 −1 1 1 1 −1 1 −1 1 1 1 −1 1 −1 1 1 1 −1 1 −1 1 1 1 −1 1 −1 1 −1 1 1 1 1 1 −1] |
| 2 | [1 −1 −1 1 −1 1 1 1 −1 −1 1 1 −1 1 −1 −1 1 1 1 −1 1 1 −1 1 1 1 −1 1 −1 −1 1 1 1 −1 1 1 −1 1 −1 −1 1 1 1 −1 1 1 −1 1 −1 −1 1 1 1 −1 1 1 −1 1 −1 −1 1 1 1 −1 1 1 −1 1 −1 −1 1 1 1 −1 1 1 −1 1 −1 −1 1 1 1 −1 1 1 −1 1 −1 −1 1 1 1 −1 1 1 −1 1 −1 −1 1 1 1 −1 1 1 −1 1 −1 −1 1 1 −1 1] |
| 3 | [1 −1 −1 1 −1 1 1 −1 1 1 −1 1 −1 −1 1 −1 1 1 1 −1 1 −1 1 1 −1 1 1 −1 1 −1 −1 1 1 1 −1 1 −1 1 −1 −1 1 1 1 1 −1 1 1 −1 −1 1 1 1 −1 1 −1 1 −1 −1 1 1 1 1 −1 −1 1 1 −1 1 1 −1 1 −1 1 −1 1 −1 1 1 1 −1 1 −1 1 1 1 −1 1 −1 1 1 −1 1 1 1 1 −1] |

$$\theta_f = \frac{33}{132}(n_f/2)\bmod 4 \qquad \text{[Equation 3]}$$

The NRS, which is a reference signal for channel estimation required for demodulation of a DL physical channel, may be generated in the same manner as in LTE. However, the NRS uses a narrowband-physical cell ID (NB-PCID) as an initial value for initialization.

The NRS is transmitted through one or two antenna ports, and up to two Tx antennas are supported for an eNB in the NB-IoT system.

The NPBCH delivers minimum system information, Master Information Block-Narrowband (MIB-NB) required for the NB-IoT UE to access the system to the NB-IoT UE.

The transport block size (TBS) of the MIB-NB is 34 bits, is updated and transmitted with a periodicity of transmission time intervals (TTIs) of 640 ms, and includes information about an operation mode, a system frame number (SFN), a hyper-SFN, the number of cell-specific reference signal (CRS) ports, and a channel raster offset.

The NPBCH signal may be repeatedly transmitted 8 times in total to enhance coverage.

The NPDCCH has the same Tx antenna configuration as the NPBCH, and supports three types of DCI formats (e.g., DCI N0, DCI N1, and DCI N2). DCI N0 is used to transmit scheduling information of a narrowband physical uplink shared channel (NPUSCH) to the UE, and DCI N1 and DCI N2 are used to transmit information required for demodulation of an NPDSCH to the UE. The NPDCCH may be transmitted repeatedly up to 2048 times, for coverage enhancement.

The NPDSCH is a physical channel used to transmit a transport channel (TrCH) such as a DL-SCH or a paging channel (PCH). The NPDSCH has a maximum TBS of 680 bits and may be transmitted repeatedly up to 2048 times, for coverage enhancement.

3.2.2. Uplink (UL)

UL physical channels include a narrowband physical random access channel (NPRACH) and an NPUSCH, and support single-tone transmission and multi-tone transmission.

Multi-tone transmission is supported only for an SCS of 15 kHz, and single-tone transmission is supported for SCSs of 3.5 kHz and 15 kHz.

On UL, when the SCS is 15 kHz, orthogonality with the LTE system is maintained, thereby providing optimum performance. However, the 3.75-kHz SCS may destroy the orthogonality, resulting in performance degradation due to interference.

An NPRACH preamble includes four symbol groups, each including a CP and five symbols. The NPRACH supports only single-tone transmission with the 3.75-kHz SCS and provides CPs of 66.7 µs and 266.67 µs in length to support different cell radiuses.

Each symbol group is subjected to frequency hopping. Subcarriers carrying the first symbol group are determined pseudo-randomly. The second symbol group hops by one subcarrier, the third symbol group hops by six subcarriers, and the fourth symbol group hops by one subcarrier. In the case of repeated transmissions, the frequency hopping procedure is repeatedly applied. To enhance coverage, the NPRACH preamble may be repeatedly transmitted up to 128 times.

The NPUSCH may support two formats. Format 1 is used for UL-SCH transmission and has a maximum TBS of 1000 bits. Format 2 is used for UCI transmission such as HARQ-ACK signaling. Format 1 supports single-tone transmission and multi-tone transmission, whereas format 2 supports only single-tone transmission. In single-tone transmission, p/2-binary phase shift keying (BPSK) and p/4-quadrature phase shift keying (QPSK) may be used to reduce a peak-to-average power ratio (PAPR).

3.2.3. Resource Mapping

In the stand-alone and guard-band modes, all resources of one PRB may be allocated to the NB-IoT system. However, there is a constraint on resource mapping in the in-band mode to maintain orthogonality with a signal of the legacy LTE system.

Without system information, the NB-IoT UE should detect the NPSS and the NSSS, for initial synchronization. Accordingly, resources (OFDM symbols 0 to 2 in each subframe) classified as a region allocated for control channels of the LTE system may not be allocated to the NPSS and NSSS, and NPSS and NSSS symbols mapped to resource elements (REs) overlapping with the LTE CRS should be punctured.

Figure 8:
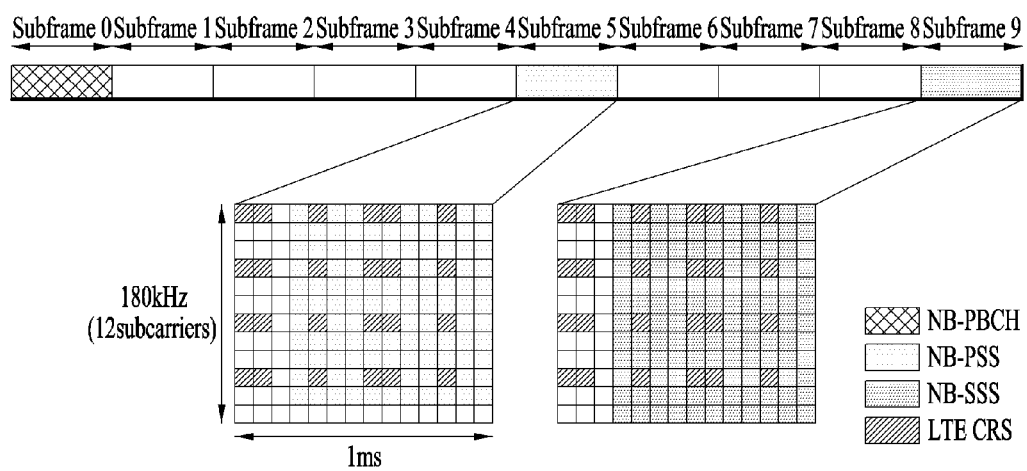
FIG. 8 is a diagram illustrating resource allocation to a signal of a narrowband Internet of things (NB-IoT) system and a signal of an LTE system in an in-band mode according to an embodiment of the present disclosure.

FIG. 8 is a diagram illustrating resource allocation to an NB-IoT signal and an LTE signal in the in-band mode according to an embodiment of the present disclosure.

As illustrated in FIG. 8, for ease of implementation, the NPSS and NSSS are not transmitted in the first three OFDM symbols of a subframe, corresponding to a resource area for the control channels of the legacy LTE system regardless of the operation mode of the NB-IoT system. REs for the legacy LTE CRS and REs for the NPSS/NSSS colliding in physical resources are punctured and mapped so as not to affect the legacy LTE system.

After the cell search, the NB-IoT UE demodulates the NPBCH without system information except for a PCID. Therefore, NPBCH symbols may not be mapped to the LTE control channel allocation region. Moreover, since four LTE antenna ports and two NB-IoT antenna ports should be assumed, REs allocated to the CRS and the NRS may not be allocated to the NPBCH. Therefore, the NPBCH should be rate-matched according to available resources.

After demodulating the NPBCH, the NB-IoT UE may acquire information about the number of CRS antenna ports. However, the NB-IoT UE still may not acquire information about the LTE control channel allocation region. Therefore, the NPDSCH carrying system information block type 1 (SIB1) data is not mapped to resources classified as the LTE control channel allocation region.

However, unlike the NPBCH, REs which are not allocated to the LTE CRS may be allocated to the NPDSCH. Since the NB-IoT UE has acquired all information related to resource mapping after receiving SIB1, the NPDSCH (except for the case where SIB1 is transmitted) and the NPDCCH may be mapped to available resources based on control channel information and the number of CRS antenna ports in the LTE system.

4. Proposed Embodiments

Configurations proposed in the present disclosure will be described in greater detail based on the above-described technical features.

The present disclosure proposes an HARQ-ACK feedback method for effectively controlling unnecessary repeated transmissions of UL data from a UE. The proposed method may be applied to, but not limited to, an MTC system, an enhanced MTC (eMTC) system, an NB-IoT system using a part of a total system bandwidth, and a half-duplex system. For the convenience of description, the MTC system will be taken as an example. Further, the use of techniques proposed as the HARQ-ACK feedback method also enable resource allocation at the level of an RE smaller than one RB.

In the MTC system, coverage enhancement (CE) mode A and CE mode B may be defined according to the position or transmission power of a UE, and different UE operations may be performed in the CE modes. CE mode B may require higher transmission power than CE mode A and a larger repetition number than CE mode A, in UL/DL transmission/reception.

Table 9 and Table 10 list repetition numbers and maximum repetition numbers for a PUSCH in the respective modes. For example, referring to Table 9, when the UE operates in CE mode A, the maximum repetition number of the PUSCH may be 16 or 32. Further, referring to Table 10, when the UE operates in CE mode B, the maximum repetition number of the PUSCH may be one of 192, 256, 384, 512, 768, 1024, 1536, and 2048.

Referring to Table 9 and Table 10, a set corresponding to each maximum repetition number may be defined, and a repetition number may be selected from the set corresponding to a configured maximum repetition number based on the maximum repetition number and a value indicated by DCI. For example, referring to Table 10, when the UE operates in CE mode B, the maximum repetition number is 1024, and the value indicated by the DCI is 3, the repetition number may be determined to be, but not limited to, the third value (e.g., 16) of the set {4, 8, 16, 64, 128, 256, 512, 1024} corresponding to the maximum repetition number 1024.

TABLE 9

| Higher layer parameter 'pusch-maxNumRepetitionCEmodeA' | {n1, n2, n3, n4} |
| --- | --- |
| Not configured | {1, 2, 4, 8} |
| 16 | {1, 4, 8, 18} |
| 32 | {1, 4, 16, 32} |

TABLE 10

| Higher layer parameter 'pusch-maxNumRepetitionCEmodeB' | {n1, n2, . . . , n8} |
| --- | --- |
| Not configured | {4, 8, 16, 32, 64, 128, 256, 512} |
| 192 | {1, 4, 8, 16, 32, 64, 128, 192} |
| 256 | {4, 8, 16, 32, 64, 128, 192, 256} |
| 384 | {4, 16, 32, 64, 128, 192, 256, 384} |
| 512 | {4, 16, 64, 128, 192, 256, 384, 512} |
| 768 | {8, 32, 128, 192, 256, 384, 512, 768} |
| 1024 | {4, 8, 16, 64, 128, 256, 512, 1024} |
| 1536 | {4, 16, 64, 256, 512, 768, 1024, 1536} |
| 2048 | {4, 16, 64, 128, 256, 512, 1024, 2048} |

Referring to Table 9 and Table 10, as numbers increase in each set, the distance between the numbers may increase.

According to Release 13 and Release 14, once the eNB configures a repetition number for the PUSCH, the UE may transmit the PUSCH repeatedly as many times as the configured repetition number according to a specific rule. The eNB may succeed in detecting the PUSCH before the PUSCH is transmitted as many times as the repetition number. However, the UE has no way to determine whether the eNB has successfully detected the PUSCH, and thus may not terminate the repeated transmissions of the PUSCH on its own before the PUSCH is transmitted repeatedly as many times as the configured repetition number. The resulting unnecessary repeated transmissions of the PUSCH may result in unnecessary power consumption of the UE, cause interference between adjacent cells, and make it difficult for the eNB to effectively use resources.

To avert the above problem, the UE may detect HARQ-ACK information for UL data periodically or intermittently, while repeatedly transmitting the UL data. The detected HARQ feedback information may refer to HARQ feedback information corresponding to the number of an HARQ process of the ongoing repeated transmissions. There may be a trade-off relationship between power consumption of the UE in the repeated transmissions of the UL data and power consumption of the UE in attempting to detect the HARQ feedback information. Accordingly, it may be inefficient to allow all UEs which transmit UL data repeatedly to detect HARQ feedback information in the same manner. Hereinbelow, a description will be given of a method of reducing the number and UE power consumption of unnecessary repeated transmissions of UL data by effectively detecting HARQ feedback information at a UE that transmits the UL data repeatedly.

4.1 Proposal 1: "Method of Configuring Duration and Periodicity for HARQ-ACK Feedback"

The eNB may explicitly configure a duration and a periodicity for an HARQ-ACK feedback operation by a UL grant indicating a UL resource allocation to the UE. In the case where the duration and periodicity of an HARQ-ACK feedback operation are explicitly configured by a UL grant, the HARQ-ACK feedback operation may be configured dynamically by each UL grant, while DCI increases in amount.

Further, the eNB may configure the duration and periodicity of the HARQ-ACK feedback operation by higher-layer signaling such as RRC signaling. The HARQ-ACK feedback information indicated by a higher-layer message may be configured to be valid until the next HARQ-ACK feedback information is configured, or expire after a predetermined time, by a higher-layer message.

Further, it may be explicitly configured by each UL grant that the HARQ-ACK feedback operation is performed, based on the HARQ-ACK feedback information configured by the higher-layer message. The HARQ-ACK feedback information configured by the higher-layer message may be information about a UE operation to be performed under a specific condition. The UE may check a specific condition based on information indicated by each UL grant, and perform a different HARQ-ACK feedback monitoring operation to detect HARQ-ACK information depending on whether the specific condition is satisfied. For example, the specific condition may include, but not limited to, at least one condition related to a CE mode, a UL repetition number, UL transmission power, or whether UL data is a retransmission. The UE may differently set at least one of a periodicity, an offset, or a duration, for HARQ-ACK feedback monitoring, depending on whether the condition is satisfied.

A specific condition and an HARQ-ACK feedback monitoring operation will be described below in detail.

1) CE Mode

Considering the trade-off relationship between transmission power and reception power, a power consumption gain brought by early termination of repeated transmissions of UL data may be relatively small in CE mode A. For example, because the repetition number is small in CE mode A relative to CE mode B, the decrease of the repetition number brought by early termination of repeated transmissions of UL data may not be great. Further, because a DL data reception operation is required to monitor HARQ-ACK feedback during transmission of the UL data, and reception power is additionally consumed in spite of conservation of transmission power, the early termination of the UL data transmission may not actually be profitable. On the other hand, since a UL signal is transmitted with maximum transmission power in CE mode B, the repetition number may also be larger in CE mode B than in CE mode A, the power consumption gain of the UE incurred by HARQ-ACK feedback monitoring may be large. Accordingly, the eNB may configure an HARQ-ACK feedback operation based on a CE mode.

2) UL Repetition Number (Repetition Level)

In general, the UL repetition number is likely to be larger for a UE operating in CE mode B than a UE operating in CE mode A. Referring to Table 6 and Table 7, however, the UL repetition number may be smaller for the UE operating in CE mode B than the UE operating in CE mode A according to an embodiment of the present disclosure. Therefore, the eNB may configure a different HARQ-ACK feedback operation according to a UL repetition number, even among UEs operating in CE mode B.

3) UL Transmission Power

A UE operating in CE mode A does not transmit a UL signal with maximum transmission power at any time. However, when a repetition number close to a maximum repetition number is configured for the UE, the UE may transmit a UL signal with transmission power close to maximum transmission power. Therefore, the eNB may configure a different HARQ-ACK feedback based on at least one of a UL repetition number or UL transmission power, even among UEs operating in CE mode A.

4) Initial Transmission or Retransmission on UL (PUSCH Detection Reliability)

The UE attempts to detect HARQ feedback information, while repeatedly transmitting UL data, because there is a possibility that the eNB succeeds in detecting the UL data before the UL data is transmitted as many times as a repetition number. Accordingly, it may be effective to apply the HARQ feedback information monitoring operation of the UE, when the UL transmission has a relatively high reliability (e.g., when there is a high possibility that the eNB detects the transmitted UL data successfully). Therefore, a different HARQ-ACK feedback monitoring operation may be configured for the UE depending on whether a UL transmission of the UE is an initial (new) transmission or a retransmission of a corresponding HARQ process number.

5) HARQ-ACK Feedback Monitoring Periodicity, Offset, and Duration

A UE configured with HARQ-ACK feedback needs to detect HARQ-ACK feedback information for UL data, while transmitting the UL data repeatedly. The HARQ-ACK feedback information may be transmitted on a channel used for ACK information transmission or an existing channel used for other purposes. For example, the LTE PHICH is a channel used to transmit ACK information, and the (M)PDCCH is an existing channel used to transmit DCI. The HARQ feedback information may be transmitted on a channel identical or similar to the PHICH or (M)PDCCH. The channel identical or similar to the (M)PDCCH may be the PDCCH, MTC PDCCH (MPDCCH), or the NPDCCH according to a system in which the UE operates. For example, if the UE operates in an eMTC system, the HARQ-ACK feedback information may be transmitted on the MPDCCH, and if the UE operates in the NB-IoT system, the HARQ-ACK feedback information may be transmitted on the NPDCCH, which should not be construed as limiting the present disclosure. Therefore, the eNB may retransmit the HARQ-ACK information once or more times to support stable detection of the HARQ-ACK information at the UE. The retransmission repetition number of the HARQ-ACK information may be determined based on the received signal-to-noise ratio (SNR) of the UE. Further, the received SNR of the UE may be related to at least one of a UL repetition number, UL transmission power, or a modulation and coding scheme (MCS), and the retransmission repetition number of the HARQ-ACK information may be related to at least one of an HARQ-ACK feedback monitoring periodicity, offset, or duration. Accordingly, at least one of the HARQ-ACK feedback monitoring periodicity, offset, or duration may be determined based on at least one of the UL repetition number, the UL transmission power, or the MCS.

4.2. Proposal 2: Method of Transmitting HARQ-ACK Information

According to an embodiment, a new channel (e.g., a channel based on the LTE PHICH) may be designed or a channel based on the legacy (M)PDCCH may be used, in order to indicate early termination of UL data transmission.

The (M)PDCCH-based channel may be designed to include DCI of the same size as legacy DCI (e.g., DCI format 6-0A/B) or DCI smaller in size than the legacy DCI. Both the use of the (M)PDCCH carrying DCI of a smaller size than the legacy DCI and the design of a new channel for transmitting HARQ feedback information may increase the complexity of the UE. However, the new channel may carry only HARQ-ACK information, whereas the (M)PDCCH-based channel carrying DCI of a smaller size than the legacy DCI may carry additional information as well as ACK information. Accordingly, the (M)PDCCH-based channel may advantageously deliver more information than the new channel. The information may be used to deliver HARQ-ACK information to a plurality of UEs by one signaling or to deliver HARQ-ACK information for a plurality of UL HARQ process numbers to one UE. Although the use of the (M)PDCCH carrying DCI of the same size as the legacy DCI does increase the complexity of the UE for blind detection, it may be difficult to additionally transmit new information without causing confusion to the UE. However, the eNB may transmit HARQ-ACK information for a plurality of HARQ process numbers to the UE by one DCI transmission, using unused states (invalid states) of a resource assignment field and an MCS field in the (M)PDCCH. For example, the eNB may transmit HARQ-ACK information by using an unused state according to each CE mode. Hereinbelow, a detailed description will be given of a method of performing an HARQ-ACK feedback operation using an unused state based on, for example, DCI formats 6-0A and 6-0B of eMTC.

1) DCI Format 6-0A for CE Mode A

{5, 6, 7, 8, 9, 9} bits may be allocated to a resource block assignment field of DCI format 6-0A, respectively for system bandwidths {1.4, 3, 5, 10, 15, 20} MHz. For every case, at least 11 states are not used.

2) DCI Format 6-0B for CE Mode B

The MCS field may be 4 bits and indicate 16 states. In CE mode B, 5 states corresponding to 11 to 15 (e.g., binary numbers 1011 to 1111) are not used among 16 states corresponding to 0 to 15 (e.g., binary numbers 00000 to 1111).

Specifically, a UE (or UE group) may blind-detect (M)PDCCH DCI format 6-0A (or 6-0B) in a legacy method, based on an already acquired cell radio network temporary identifier (C-RNTI) (for the UE group, a specific RNTI which may be shared in the UE group). If a value corresponding to an unused state is allocated to the resource block assignment field (the MCS field in the case of DCI format 6-0B) of the detected DCI, the UE may interpret the DCI as serving the purpose of HARQ-ACK feedback. To specify the purpose of HARQ-ACK feedback, a specific one of values corresponding to 11 states (5 states in DCI format 6-0B) may be indicated. Therefore, the UE may interpret the DCI differently according to the value of the unused state.

Further, the eNB may transmit HARQ-ACK information for a plurality of HARQ process numbers by using the remaining bits (e.g., 19 in DCI format 6-0A). For example, the eNB may transmit the HARQ-ACK information for the plurality of process numbers by applying a bitmap to the remaining bits, which should not be construed as limiting the present disclosure.

For example, given 8 HARQ processes, the eNB may allocate 8 bits to the respective HARQ processes and transmit each of ACK and NACK as 0 or 1. In another example, the eNB may transmit HARQ-ACK information for each HARQ process by designing ACKs/NACKs for the respective HARQ processes to be in a specific relationship (e.g., in a method such as channel coding), in order to increase ACK/NACK reliability.

Further, if the number of available bits for transmission of HARQ-ACK information is less than the number of HARQ processes for which an HARQ-ACK feedback is intended, the eNB may transmit HARQ-ACK information by bundling a plurality of HARQ process numbers into one group. The bundling of a plurality of HARQ process numbers into one group offers the benefit that a minimum number of bits required to indicate an ACK/NACK combination for N HARQ processes is easily secured. Particularly when N HARQ processes are repeatedly transmitted at the same time on UL, if the eNB has already detected M(≤N) HARQ processes as ACK, the UE may terminate the UL transmissions of the M HARQ processes by one (M)PDCCH monitoring. Further, the UE may terminate the ACK/NACK monitoring or (M)PDCCH monitoring for the M HARQ processes.

The number M of HARQ processes for which HARQ-ACK information is transmitted on the (M)PDCCH may be equal to the maximum number of HARQ processes, the number of UL scheduled HARQ processes, or the number of HARQ processes for which ACK is not received as a feedback until a specific time among the UL scheduled HARQ processes, in a corresponding CE mode. Exceptionally, when a UL channels (e.g., a PUCCH or an (N)PUSCH carrying only aperiodic CSI) having no special constraint on an HARQ process number are repeatedly transmitted, an $(N+a)^{th}$ HARQ process number may be indicated and additionally included. Herein, a may be, but not limited to, 1. The (N)PUSCH may include, but not limited to, a PUSCH or NPUSCH according to the system in which the UE operates. For example, the (N)PUSCH may be the PUSCH for a UE operating in the eMTC system, and the NPUSCH for a UE operating in the NB-IoT system.

The UE should continue UL transmission for an HARQ process for which ACK has not been fed back among N or (N+a) HARQ processes. The UL transmission may be performed in non-adaptive HARQ. For example, the UL transmission for the HARQ process for which ACK has not been fed back may be performed with an initially configured MCS and redundancy version (RV). The RV may be based on a specific RV pattern used for a retransmission with the MCS.

Further, remaining bits after transmission of HARQ-ACKs for the N or (N+a) HARQ processes may be used to reconfigure a UL transmission method (e.g., an MCS, a repetition number, UL resources, and so on) for any other HARQ process for which ACK has not been fed back.

The afore-described DCI formats 6-0A and 6-0B may be replaced with DCI formats 6-1A and 6-1B, respectively, and different methods of transmitting HARQ-ACK information and different methods of interpreting DCI may be used for FDD and TDD. Aside from the afore-described DCI, DCI including an unused state may be used to transmit HARQ-ACK information similarly to the above method.

The above-described method may also be applied to the NB-IoT system, and the NB-IoT system may support an HARQ-ACK feedback operation for early termination of UL data transmission. Particularly in a TDD system, a DL subframe and a UL subframe may alternate every predetermined period. The UE may expect an ACK for an ongoing (N)PUSCH during a DL subframe period which appears in the course of repeated transmissions of the scheduled (N)PUSCH.

In the NB-IoT system, when HARQ-ACK information is transmitted, synchronized HARQ-ACK information similar to the LTE PHICH may be transmitted. However, it may be more effective to use a UL grant in terms of prevention of an increase in the complexity of the UE. For example, the MCS field and the subcarrier indication field of a UL grant (DCI N0) may include one or more unused states. The eNB may feedback HARQ-ACK information for a plurality of UL HARQ processes as well as HARQ-ACK information for one UL HARQ process by using unused states of the MCS field and the subcarrier indication field.

Further, before an NPUSCH is transmitted as many times as a configured repetition number, HARQ-ACK information may be transmitted only when the HARQ-ACK information is ACK to avoid the effect of a false alarm on the UE. For example, the MCS field of the UL grant (DCI N0) is 4 bits, and states corresponding to 11 to 15 out of 16 states corresponding to 0 to 15 are not defined. Further, for the 6-bit subcarrier indication field, states corresponding to 19 to 63 out of 64 states corresponding to 0 to 63 are not used when the subcarrier spacing is 15 kHz, and states corresponding to 48 to 63 out of the 64 states are not used when the subcarrier spacing is 3.75 kHz. Accordingly, upon detection of the value of a non-defined or unused state in DCI N0, the UE may interpret HARQ-ACK information for a specific UL HARQ process as ACK. Therefore, the eNB may indicate to the UE that scheduling of the previous transmitted NPUSCH is the last scheduling without explicitly scheduling a new NPUSCH by using an unused state of the MCS field or the subcarrier spacing field.

To mitigate the effect of a false alarm on the UE, ACK/NACK may be defined by jointly encoding unused states of the MCS field and the subcarrier indication field. For example, when the value of an {MCS, subcarrier indication} field combination is {11, 48}, it may be defined as ACK for UL HARQ process 1, and when the value of the {MCS, subcarrier indication} field combination is {11, 49}, it may be defined as NACK for UL HARQ process 1. When the value of the {MCS, subcarrier indication} field combination is {12, 48}, it may be defined as ACK for UL HARQ process 2, and when the value of the {MCS, subcarrier indication} field combination is {12, 49}, it may be defined as NACK for UL HARQ process 2. When the value of the {MCS, subcarrier indication} field combination is {13, 48}, it may be defined as ACK/ACK for UL HARQ process 1 and UL HARQ process 2, respectively, and when the value of the {MCS, subcarrier indication} field combination is {13, 49}, it may be defined as ACK/NACK for UL HARQ process 1 and UL HARQ process 2, respectively. When the value of the {MCS, subcarrier indication} field combination is {13, 50}, it may be defined as NACK/ACK for UL HARQ process 1 and UL HARQ process 2, respectively, and when the value of the {MCS, subcarrier indication} field combination is {13, 51}, it may be defined as NACK/NACK for UL HARQ process 1 and UL HARQ process 2, respectively. However, the present disclosure is not limited to these definitions. Therefore, for the above {MCS, subcarrier indication} field combinations, other values out of the values corresponding to the unused states may be used.

When the UE receives a NACK feedback for a specific UL HARQ process, the UE may interpret the NACK feedback as indicating continuous transmission of the UL HARQ process which has been transmitted previously. However, upon receipt of an ACK feedback for one HARQ process, the UE may transmit a UL HARQ process for which a NACK feedback has been received or an ACK feedback has not been received, by using resources allocated to the UL HARQ process.

Further, when unused states of the MCS field and the subcarrier indication field are not jointly encoded, the MCS field may be used to feed back HARQ-ACK information, and the subcarrier indication field may be used to configure an RV for an NPUSCH transmission in the case of NACK.

Further, according to an embodiment of the present disclosure, join coding may be used to change an RV and a modulation order for a retransmission (or a successive NPUSCH transmission), for a UL HARQ process for which a NACK feedback has been received.

Further, when the values of specific unused states are detected in the MCS field and the subcarrier indication field, all of the remaining fields in DCI N0 may be interpreted differently, and the DCI format and the value of an unused state may vary depending on systems.

4.3. Proposal 3: Method of Indicating UL Scheduling at Partial RB Level

According to an embodiment of the present disclosure, it is possible to perform UL scheduling at the level of an RE smaller in size than an RB. When UL scheduling is performed at the RE level, there may be a constraint that only QPSK is supported irrespective of a CE mode.

Further, an RE-level resource allocation unit (e.g., the number of REs or subcarriers) may be configured within a set of smaller numbers than 12, such as {1, 2, 3, 6}. {1, 3, 6} are RE-level scheduling units smaller than 12, which are allowed in the NB-IoT system. According to some embodiments, the RE-level scheduling unit may be set to a value other than 1, 3 and 6.

As described before, unused states may include a part of the states of the MCS field and a part of the states of the resource assignment field.

Further, a zero-padding added to the end of part of payload in DCI formats 6-0A and 6-0B may be used in RE-level resource allocation to match to the sizes of DCI formats 6-1A and 6-1B. Now, a detailed description will be given of an RE-level UL scheduling method using an MCS field and a resource assignment field.

1) CE Mode A

In CE mode A, when the value of the MCS field in DCI format 6-0A is 15, the UE may interpret the MCS field as indicating RE-level UL scheduling and the UE may transmit one RE or predetermined M REs in a specific RE of an RB indicated by an RB allocation field. For example, when the value of the MCS field is 15, the UE may not need to expect scheduling of one or more RBs in a narrowband. Accordingly, an RB allocation for a narrowband, indicated by the RB allocation field may be performed at the level of predetermined M REs, not at an RB level, where M may be configured by a higher layer or may be a fixed value. For example, 72 REs of 6 RBs may be divided into RE groups each including 3 REs (M=3) and resources may be scheduled in units of an RE group. Then, a 5-bit RB-allocation {0 1, 2, . . . , 31} may indicate the starting position of an RE group including 3 REs as one of {0, 3, 6, . . . , 69, . . . , 93}. However, according to an embodiment of the present disclosure, REs may be grouped by every two REs or every six REs, not by every three REs, and the present disclosure is not limited to the above example. Further, according to an embodiment of the present disclosure, it may be configured that the values larger than 69 in {0, 3, 6, . . . , 69, . . . , 93} are not used.

Further, an HARQ process number field of DCI may be used to indicate a TBS. For example, when UL scheduling is performed at a partial RB level (at an RE level), 8 HARQ processes may not be needed. For example, on the assumption that only 2 HARQ processes are needed as in CE mode B, HARQ process numbers 0 to 3 may be used to indicate a first HARQ process with {0, 1, . . . , 3} used as TBS information (ITBS), and HARQ process numbers 4 to 7 may be used to indicate a second HARQ process with {4, 5, . . . , 7} used as ITBS. However, the present disclosure is not limited to the above example, and the above values may vary according to embodiments of the present disclosure.

According to an embodiment of the present disclosure, a part of 8 HARQ processes may be specified and used for partial RB-level UL scheduling. For example, an HARQ process number specified for partial RB-level UL scheduling may be configured by a higher layer. If partial RB-level UL scheduling is indicated, more various RE-level combinations may be required. Accordingly, a modulation order (QPSK or 16QAM), ITBS, and an RE-level resource allocation may be indicated by re-combining 4 bits of the legacy MCS field with 5 bits of the RB allocation field. The above method may be applied in the same manner to CE mode B described below. Herein, the modulation order may be fixed to QPSK.

2) CE Mode B

Partial RB scheduling may be configured for CE mode B in a similar manner to for CE mode A, and unused states of each field may be different from in CE mode A.

For example, the MCS field of DCI format 6-0B is 4 bits long, and thus a total of 16 states may exist. 5 states corresponding to 11 to 15 out of 16 states corresponding to 0 to 15 are not used. Therefore, when the MCS field is set to one of the values 11 to 15, the UE may interpret the MCS field as indicating partial RB-level scheduling. Further, a value between 11 and 15 may be used as specific ITBS.

When partial RB-level scheduling is indicated, the UE may interpret 3 bits for RB allocation in a narrowband as an RE-level resource allocation. The 3 bits may be used in RE-level resource allocation in a similar manner to in CE mode A. Alternatively, according to an embodiment of the present disclosure, if the positions of RBs available for partial RB-level allocation are limited to specific R RBs, a method similar to in CE mode A may be applied to the R RBs.

4.4. Proposal 4: Method of Configuring HARQ-ACK Feedback Monitoring Duration

Although an eMTC UE may support two or more HARQ processes, an NB-IoT UE may support only one HARQ process. Further, while the eMTC UE may support all of full duplex-FDD (FD-FDD), half duplex-FDD (HD-FDD), and TDD, the NB-IoT UE may support only HD-FDD. An NB-IoT UE supporting TDD will be introduced in the Release 15 standard.

In general, each of the eMTC UE operating in HD-FDD and the NB-IoT UE operating in HD-FDD may not monitor an (N)PDCCH on DL before transmitting an (N)PUSCH as many times as a configured repletion number (e.g., N) during a subframe or slot period. Therefore, considering the probability that the (N)PUSCH passes through a CRC check before the eNB receives the ongoing (N)PUSCH N times on UL, the UE needs to discontinue the transmission of the (N)PUSCH and monitor a DL HARQ-ACK feedback channel (e.g., an (N)PDCCH, an explicit ACK/NACK channel, or a signal) for a predetermined time, to monitor an (N)PDCCH or an explicit ACK/NACK.

However, when there is a low probability that the eNB detects the ongoing (N)PUSCH, the HARQ-ACK feedback monitoring operation may increase the power consumption of the UE, and cause a delay. Therefore, when a specific condition is not satisfied, the UE (particularly, a UE performing an HD-FDD operation) may not perform HARQ feedback monitoring, and the eNB may also continue receiving the (N)PUSCH which is transmitted N times by the UE, without transmitting HARQ-ACK information.

Even though the eNB schedules the UE to transmit the (N)PUSCH N times and a CRC check is successful for a relatively small number of (N)PUSCH transmissions, it may be assumed that before an HARQ-ACK feedback condition is satisfied, the eNB does not transmit HARQ-ACK information to the UE or the UE does not perform HARQ-ACK feedback monitoring. For example, the condition for not performing HARQ-ACK feedback monitoring may be set to "before the (N)PUSCH is transmitted as many times as a predetermined ratio of the repetition number N". The predetermined ratio may be configured by the eNB or may be set to a specific value in the standard.

Further, the predetermined ratio may be changed according to at least one of a CE mode, a CE level, reference signal received power (RSRP), reference signal received quality (RSRQ), scheduling information (e.g., an MCS, resource allocation information, and so on) of the (N)PUSCH, or a ratio of previously received or transmitted ACKs/NACKs.

Further, in the case where an HARQ feedback operation is performed to early terminate UL data transmission, only when feedback information is ACK, the eNB may be configured to transmit the feedback information to the UE. Upon receipt of NACK, the UE may ignore the detected NACK, determining that the UE has wrongly detected the NACK. Accordingly, the HARQ-ACK feedback monitoring may be used for the purpose of terminating the scheduled (N)PUSCH transmission before completion of N repeated transmissions of the (N)PUSCH. Further, for the eNB to feed back NACK through HARQ-ACK feedback monitoring, another purpose needs to be served, in addition to early termination of UL data transmission. For example, the eNB may feed back NACK through HARQ-ACK feedback monitoring to make the UE change at least one of the RV, modulation order, or resource allocation of the ongoing (N)PUSCH in a predetermined method before the UE performs HARQ-ACK feedback monitoring, or to make the UE continue transmitting UL data according to directly re-scheduled information by HARQ-ACK feedback monitoring.

The above method may be applied in the same or a similar manner to a UE operating in FD-FDD or TDD as well as a UE operating in HD-FDD.

When a new SS (or HARQ-ACK monitoring occasion) is configured for early termination of UL data transmission, the SS may be defined by a specific period derived from a scheduled repetition number. For example, given a repetition number of N, when the UE has not transmitted the (N)PUSCH as many times as a predetermined ratio of N, the eNB may not configure the SS, or even though the eNB configures the SS, the UE may ignore the SS. The predetermined ratio and the SS may be configured differently according to at least one of {CE mode, UL repetition number, UL transmission power, or initial transmission or retransmission of corresponding UL data}. Further, the SS may be defined based on at least one parameter of {HARQ feedback monitoring periodicity, offset, or duration}. Even when a new SS (or monitoring occasion) is defined for early termination of UL data transmission and/or early termination of (M)PDCCH/NPDCCH monitoring, if the (N)PUSCH is not transmitted as many times as the predetermined ratio of the repetition number N in the SS, the UE may ignore the SS or may not receive the SS.

Further, when the repetition number of the scheduled (N)PUSCH is relatively small, the power consumption reduction of the UE brought by early termination of UL transmission may be relatively small, compared to the power consumption of HARQ-ACK monitoring. For example, when the repetition number of the scheduled (N)PUSCH is less than a specific value, an SS for monitoring an HARQ-ACK feedback may not be defined.

Further, even when an SS for (early) HARQ-ACK monitoring has been configured, if the UE has not transmitted the (N)PUSCH repeatedly a predetermined number of times or the number of repeated transmissions is less than the predetermined ratio of the scheduled (N)PUSCH repetition number, the UE may not monitor or may ignore an HARQ-ACK feedback in the SS.

Further, the length or position of the SS for HARQ-ACK feedback monitoring may be configured differently according to the repetition number of the scheduled (N)PUSCH. For example, given repetition numbers of 2048 and 512 for the (N)PUSCH, the lengths of SSs for (early) HARQ-ACK monitoring may be configured in proportion to the repetition numbers. Further, according to an embodiment of the present disclosure, the SS for HARQ-ACK feedback monitoring may be determined based on a (maximum) repetition number or $r_{max}$ (or $R_{max}$) of a UE-specific SS (USS) of the UE.

The above method may also be applied for early termination of DL data transmission. For example, before scheduled DL data transmission is completed, the UE may feed back ACK for a corresponding DL process by UL transmission. Further, as descried before, given K as the repetition number of a scheduled (N)PDSCH, the UE may not be allowed to feed back ACK before receiving the (N)PDSCH as many times as a predetermined ratio of K. Feeding back ACK may amount to feeding back ACK for the DL process on UL before the scheduled DL data transmission is completed. In this case, NACK may not be fed back explicitly. However, even though the UE may feed back ACK after receiving the (N)PDSCH as many times as the predetermined ratio of K, the eNB may determine failure in detecting the ACK to be DTX and consider the DTX to be NACK. The eNB may the re-schedule the (N)PDSCH for the same process number of the ongoing (N)PDSCH with different parameters from those used in the previous transmission scheduling. Further, when the UE does not determine ACK for the DL process in a period in which the UE may transmit HARQ-ACK information, the UE may expect that the DL process will be transmitted in a different pattern from initially scheduled by the eNB after a predetermined time. The pattern may include, but not limited to, at least one of transmission power, an RV, a modulation order, an increased repetition number, or a PMI.

5. Configurations of Apparatuses

Figure 9:
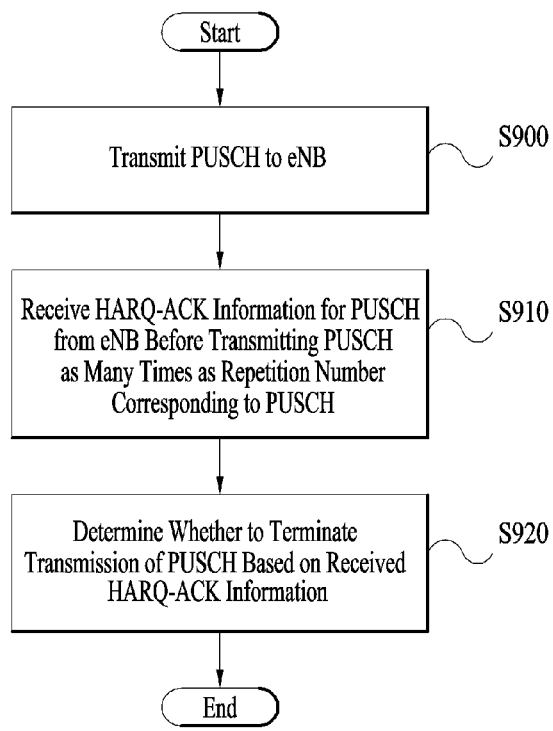
FIG. 9 is a flowchart illustrating a method of transmitting and receiving a signal to and from a base station (BS) by a user equipment (UE) according to an embodiment of the present disclosure.

FIG. 9 is a flowchart illustrating a method of transmitting and receiving a signal to and from an eNB by a UE according to an embodiment of the present disclosure.

According to an embodiment of the present disclosure, a UE and an eNB may operate in FD-FDD or TDD. The UE and the eNB may also operate in an MTC or NB-IoT system, which should not be construed as limiting the present disclosure.

Referring to FIG. 9, the UE may transmit a PUSCH to the eNB in step S900. The UE may transmit the PUSCH once or more times in a repetition number configured for the PUSCH.

In step S910, the UE may receive HARQ-ACK information for the PUSCH from the eNB before transmitting the PUSCH as many times as the repetition number. The HARQ-ACK information may be information used for early termination of the PUSCH before the PUSCH is transmitted as many times as the repetition number.

The HARQ-ACK information is transmitted in a UL grant used to indicate UL scheduling information or in DCI. When the HARQ-ACK information is transmitted in DCI, one or more states of the DCI may be used to indicate HARQ-ACK feedback for the ongoing PUSCH. The states used to indicate the HARQ-ACK feedback may be unused or non-defined states among a plurality of states for the DCI. Further, when the UE operates in the MTC system, the UL grant or DCI may be transmitted on an MPDCCH.

When the HARQ-ACK information is transmitted in DCI, the DCI may be of the same size as DCI formats 6-0A and 6-0B. Further, when the HARQ-ACK information is transmitted in DCI, the HARQ-ACK information may be transmitted in DCI of a different format according to a CE mode of the UE. For example, one or more states of a resource assignment field in DCI format 6-0A or one or more states of an MCS field in DCI format 6-0B may be used for transmitting the HARQ-ACK transmission according to the CE mode of the UE. More specifically, when the UE operates in CE mode A, one or more states of the resource assignment field of DCI format 6-0A may be used to indicate HARQ-ACK feedback for the PUSCH. When the UE operates in CE mode B, one or more states of the MCS field of DCI format 6-0B may be used to indicate HARQ-ACK feedback for the PUSCH.

When the UE operates in the NB-IoT system, one or more states of the MCS field and the subcarrier indication field of DCI may be used to indicate HARQ-ACK feedback for a PUSCH.

Further, the HARQ-ACK information that the UE receives from the eNB may include HARQ-ACK information about a plurality of HARQ processes. When the number of bits used to transmit the HARQ-ACK information is less than the number of HARQ processes, a predetermined number of HARQ processes out of a plurality of HARQ processes may be bundled into one group and the UE may receive HARQ-ACK information for the group. Accordingly, HARQ-ACK information for the plurality of HARQ processes may be transmitted in fewer bits than the number of the plurality of HARQ processes.

Further, the UE may receive HARQ-ACK information after transmitting the PUSCH as many times as or more times than a predetermined ratio of a repetition number configured for the ongoing PUSCH.

In step S920, the UE may determine whether to terminate the PUSCH transmission based on the received HARQ-ACK information. If the received HARQ-ACK information is ACK, the UE may terminate the repeated transmissions of the PUSCH before transmitting the PUSCH as many times as the repetition number configured for the PUSCH. Accordingly, even before transmitting the PUSCH as many times as the repetition number configured for the PUSCH, upon receipt of ACK for the PUSCH, the UE may early terminate the PUSCH transmission. Therefore, the UE may reduce power consumption used for unnecessary repeated transmissions of UL data, and the eNB may use radio resources more efficiently.

Figure 10:
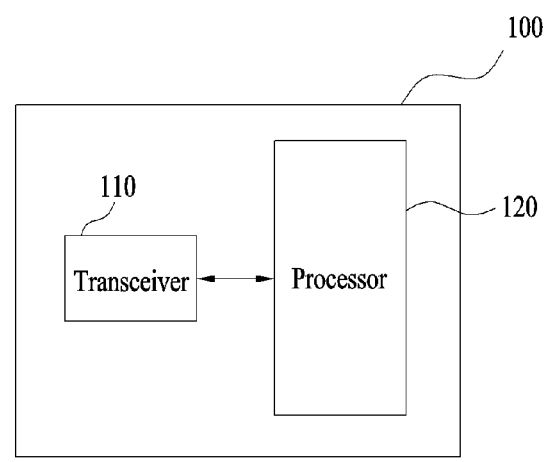
FIG. 10 is a block diagram illustrating the configuration of a UE according to an embodiment of the present disclosure.

FIG. 10 is a block diagram illustrating the configuration of a UE according to an embodiment of the present disclosure.

A UE 100 illustrated in FIG. 10 may perform the signal transmission and reception operations of a UE illustrated in FIGS. 1 to 9.

According to an embodiment of the present disclosure, the UE 100 may operate as a transmitter on UL and a receiver on DL.

According to an embodiment of the present disclosure, the UE 100 may include a transceiver 110 and a processor 120. However, the UE 100 may be configured with more components than illustrated, and two or more components may be combined into a single component. For example, in addition to the transceiver 110 and the processor 120, the UE 100 may further include a memory and an antenna. Further, the transceiver 110 may be configured separately into a transmitter and a receiver. Each component will be described below.

The transceiver 110 is operatively coupled to the processor 120, and receives and transmits a signal from and to an external device (e.g., an eNB).

According to an embodiment of the present disclosure, the transceiver 110 of the UE 100 may perform, but not limited to, at least one of a packet modulation and demodulation function, a high-speed packet channel coding function, OFDMA packet scheduling, or channel multiplexing, for data transmission and reception. Further, according to an embodiment of the present disclosure, each of the UE 100 and an eNB 200 may further include a low power radio frequency (RF)/intermediate frequency (IF) module.

The processor 120 provides overall control to the UE 100.

According to an embodiment of the present disclosure, the processor 120 may control the transceiver 110 to transmit a PUSCH to the eNB, control the transceiver 110 to receive HARQ-ACK information for the PUSCH from the eNB before transmitting the PUSCH as many times as a repetition number configured for the PUSCH, and determine whether to terminate the transmission of the PUSCH based on the received HARQ-ACK information.

According to an embodiment, the UE 100 may be a UE operating in an eMTC or NB-IoT system. When the UE 100 is a UE operating in the NB-IoT system, the PUSCH may refer to an NPUSCH.

Further, the HARQ-ACK information may be transmitted in DCI or a UL grant used to indicate UL scheduling information, and the DCI or the UL grant may be transmitted on an MPDCCH or an NPDCCH. For example, when the UE 100 is a UE operating in an eMTC system, the DCI or the UL grant may be transmitted on the MPDCCH, and when the UE 100 is a UE operating in the NB-IoT system, the DCI or the UL grant may be transmitted on the NPDCCH.

According to an embodiment of the present disclosure, the UE 100 may be, not limited to, any of a personal digital assistant (PDA), a cellular phone, a personal communication service (PCS) phone, a global system for mobile (GSM) phone, a wideband code division multiple access (WCDMA) phone, a mobile broadbandsSystem (MBS) phone, a hand-held PC, a laptop PC, a smart phone, a multi mode-multi band (MM-MB) terminal, etc. For example, the smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which may operate in any of a mobile Internet system and other mobile communication systems (e.g. CDMA 2000, WCDMA, etc.).

Figure 11:
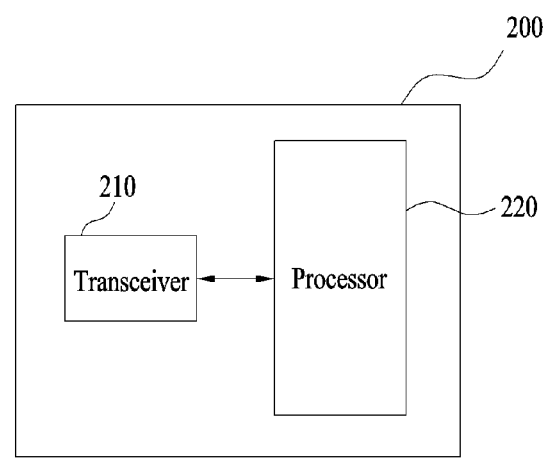
FIG. 11 is a block diagram illustrating the configuration of a BS according to an embodiment of the present disclosure.

FIG. 11 is a block diagram illustrating the configuration of an eNB according to an embodiment of the present disclosure.

The eNB 200 illustrated in FIG. 11 may perform the signal transmission and reception operations of an eNB illustrated in FIGS. 1 to 9.

According to an embodiment of the present disclosure, the eNB 200 may include a transceiver 210 and a processor 220. However, the eNB 200 may be configured with more components than illustrated, and two or more components may be combined into a single component. For example, in addition to the transceiver 210 and the processor 220, the eNB 200 may further include a memory and an antenna.

According to an embodiment of the present disclosure, the transceiver 210 may be operatively coupled to the processor 220, and control transmission and reception of signals, information, data, and/or messages.

According to an embodiment of the present disclosure, the processor 220 may control the transceiver 210 to receive a PUSCH from a UE, determine HARQ-ACK information for the PUSCH, and transmit the determined HARQ-ACK information to the UE before the PUSCH is received as many times as a repetition number corresponding to the PUSCH.

Embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory and executed by the processor 120 or 220.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications.

The invention claimed is:

1. A method of communicating by a user equipment (UE) in a wireless communication system, the method comprising:
receiving scheduling information regarding scheduling for N repeated transmissions of a physical uplink shared channel (PUSCH), wherein N denotes a repetition number for the PUSCH transmissions;
starting the repeated transmission of the PUSCH based on the scheduling information;
receiving hybrid automatic repeat request-acknowledgment (HARQ-ACK) information on the PUSCH before the repeated transmission of the PUSCH has ended; and
determining whether to stop the repeated transmission of the PUSCH based on the HARQ-ACK information,
wherein a search space for receiving the HARQ-ACK information is configured by the UE based on the repetition number being identical to or larger than a predetermined value.

2. The method of claim 1,
wherein the HARQ-ACK information is obtained based on downlink control information (DCI), and
wherein the DCI is received on a machine type communication physical downlink control channel (MPDCCH) or a narrowband physical downlink control channel (NPDCCH).

3. The method of claim 2, at least one state of the DCI are used to indicate HARQ-ACK feedback for the PUSCH.

4. The method of claim 2,
wherein based on the UE configured to operate in coverage enhancement (CE) mode A, a format of the DCI is determined as DCI format 6-0A, and at least one state of a resource assignment field included in the DCI format 6-0A is related to indicating HARQ-ACK feedback for the PUSCH, and
wherein based on the UE configured to operate in CE mode B, the format of the DCI is determined as DCI format 6-0B, and at least one state of a modulation and coding scheme (MCS) field included in the DCI format 6-0B is related to indicating HARQ-ACK feedback for the PUSCH.

5. The method of claim 2, wherein a size of the DCI is identical to a size DCI format 6-0A or DCI format 6-0B.

6. The method of claim 2, further comprising:
obtaining information on at least one of a duration of a HARQ-ACK feedback, a periodicity of the HARQ-ACK feedback, or a condition for performing the HARQ-ACK feedback from an uplink grant included in the DCI or a higher-layer message; and
performing the HARQ-ACK feedback based on the obtained information.

7. The method of claim 6, wherein the condition for performing the HARQ-ACK feedback comprises at least one condition of a CE mode, an uplink repetition number, uplink transmission power, or an initial transmission or a retransmission.

8. The method of claim 1, wherein the UE is configured to operate in frequency division duplex (FDD) or time division duplex (TDD).

9. The method of claim 1, wherein the UE is configured to operate in a machine type communication (MTC) system or narrowband internet of things (NB-IoT) system.

10. The method of claim 9, wherein based on the UE configured to operate in the NB-IoT system, at least one state of an MCS field and a subcarrier indication field included in DCI is related to indicating HARQ-ACK feedback for the PUSCH.

11. The method of claim 1, wherein the HARQ-ACK information is received after the PUSCH is transmitted as many times as or more times than a predetermined ratio of the repetition number.

12. The method of claim 11, wherein the predetermined ratio is determined based on at least one of: coverage enhancement (CE) mode of the UE, the CE level of the UE, reference signal received power (RSRP) of a predetermined reference signal, reference signal received quality (RSRQ) of the predetermined reference signal, or the scheduling information.

13. The method of claim 1,
wherein the HARQ-ACK information comprises HARQ-ACK information of a group related to a plurality of HARQ processes, and
wherein the HARQ-ACK information of the group is obtained based on bundling a predetermined number of HARQ processes among the plurality of HARQ processes into one group based on that a number of bits used to transmit the HARQ-ACK information is less than a number of the plurality of HARQ processes.

14. The method of claim 1, wherein the predetermined value is related to a possibility of the PUSCH being available to be detected from a base station.

15. An apparatus of communicating in a wireless communication system, the apparatus comprising:
a transceiver; and
at least one processor coupled with the transceiver and configured to:
receive scheduling information regarding scheduling N repeated transmissions of a physical uplink shared channel (PUSCH), wherein N denotes a repetition number for the PUSCH transmissions;
start the repeated transmission of the PUSCH based on the scheduling information;
receive hybrid automatic repeat request-acknowledgment (HARQ-ACK) information on the PUSCH before the repeated transmission of the PUSCH has ended; and
determine whether to stop the repeated transmission of the PUSCH based on the HARQ-ACK information,
wherein a search space for receiving the HARQ-ACK information is configured by the at least one processor based on the repetition number being identical to or larger than a predetermined value.

* * * * *